(12) United States Patent
Singer

(10) Patent No.: US 7,985,151 B2
(45) Date of Patent: Jul. 26, 2011

(54) TENSIONING DEVICE OF A TRACTION MECHANISM DRIVE

(75) Inventor: Johann Singer, Grossenseebach (DE)

(73) Assignee: Schaeffler KG, Herzogenaurach (DE)

( * ) Notice: Subject to any disclaimer, the term of this patent is extended or adjusted under 35 U.S.C. 154(b) by 489 days.

(21) Appl. No.: 12/282,770

(22) PCT Filed: Feb. 14, 2007

(86) PCT No.: PCT/EP2007/051443
§ 371 (c)(1),
(2), (4) Date: Sep. 12, 2008

(87) PCT Pub. No.: WO2007/113039
PCT Pub. Date: Oct. 11, 2007

(65) Prior Publication Data
US 2009/0082146 A1 Mar. 26, 2009

(30) Foreign Application Priority Data
Mar. 31, 2006 (DE) .......................... 10 2006 014 942

(51) Int. Cl.
*F16H 7/12* (2006.01)
(52) U.S. Cl. ........................................ 474/135; 474/117
(58) Field of Classification Search .................. 474/101, 474/109, 112, 113, 117, 133, 135
See application file for complete search history.

(56) References Cited

U.S. PATENT DOCUMENTS

| 5,083,983 | A | * | 1/1992 | Hirai et al. | 474/135 |
| 6,059,679 | A | * | 5/2000 | Tsutsui et al. | 474/135 |
| 6,497,632 | B2 | * | 12/2002 | Ayukawa et al. | 474/135 |
| 6,767,303 | B2 | * | 7/2004 | Ayukawa | 474/135 |
| 7,384,355 | B2 | * | 6/2008 | Ayukawa et al. | 474/135 |
| 7,588,507 | B2 | * | 9/2009 | Ayukawa et al. | 474/135 |
| 2003/0216204 | A1 | | 11/2003 | Serkh | |

FOREIGN PATENT DOCUMENTS

| DE | 42 20 879 | 1/1994 |
| DE | 698 02 448 | 7/2002 |
| DE | 103 56 235 | 6/2005 |
| DE | 601 05 759 | 10/2005 |
| EP | 0 575 662 A | 12/1993 |
| EP | 0 780 597 A | 6/1997 |
| GB | 2 328 728 A | 3/1999 |
| WO | 01/51828 A | 7/2001 |

* cited by examiner

Primary Examiner — William E Dondero
(74) Attorney, Agent, or Firm — Lucas & Mercanti, LLP

(57) ABSTRACT

The invention relates to a tensioning device of a traction mechanism drive, having a tensioning lever mounted on a base housing and rotatable by a pivot bearing. A coil spring is arranged coaxially to the pivot bearing. The pivot bearing comprises a bearing journal, a bearing hub and at least one plain bearing sleeve which is arranged between the bearing journal and the bearing hub, and a central radial force application plane of the tensioning roller is axially spaced apart from a central radial bearing plane of the pivot bearing.

11 Claims, 5 Drawing Sheets

TENSIONING DEVICE OF A TRACTION MECHANISM DRIVE

This application is a 371 of PCT/EP2007/051443 filed Feb. 14, 2007, which claims the priority of DE 10 2006 014 942.4 filed Mar. 31, 2006, both of which are hereby incorporated by reference.

FIELD OF THE INVENTION

The invention relates to a tensioning device of a traction mechanism drive, having a tensioning lever which is mounted on a base housing so as to be able to rotate via a pivot bearing and, radially spaced apart from the axis of rotation of the pivot bearing, is provided with a rotatable tensioning roller, which tensioning lever can, by means of a torsional spring which is configured as a helical spring, is arranged coaxially with the pivot bearing and is connected at both spring ends at the housing side to the base housing and at the lever side to the tensioning lever, be acted on with a torsional moment about the axis of rotation of the pivot bearing, the pivot bearing comprising a bearing journal, a bearing hub and at least one plain bearing sleeve arranged between the bearing journal and the bearing hub, and a central radial force application plane of the tensioning roller being for the most part axially spaced apart from a central radial bearing plane of the pivot bearing.

BACKGROUND OF THE INVENTION

Tensioning devices of the above-described design are used in different embodiments, preferably in auxiliary unit pulleys of internal combustion engines. Tensioning devices of this type are known both in an internally mounted embodiment, the bearing journal, which is rigidly connected to the tensioning lever, being mounted in the bearing hub which forms part of the base housing, and in an externally mounted embodiment, the bearing hub, which is rigidly connected to the tensioning lever, being mounted on the bearing journal which forms part of the base housing, the base housing being provided in each case for fastening the respective tensioning device to a motor housing, such as for example the crankcase or the control housing of an internal combustion piston engine.

With regard to the arrangement of the tensioning roller, it is additionally possible to distinguish, in a tensioning device of this type, between what is known as an offset or Z embodiment, in which the tensioning roller is arranged axially on the outside of the tensioning lever that is remote from the base housing, and what is known as an in-line embodiment or U embodiment, in which the tensioning roller is arranged radially laterally of the base housing, axially on the inside of the tensioning lever that faces the base housing.

The tensioning lever is mounted radially in or on the base housing via at least one plain bearing sleeve which is arranged between the bearing hub and the bearing journal and is usually made of a durable and at the same time low-friction plastics material. A resulting radial force, which is obtained from the spring force of the torsional spring, acting on the tensioning lever and the reaction force exerted on the tensioning lever by the traction mechanism via the tensioning roller, acts on the bearing sleeve. However, as at least one of the radial planes in which the spring force of the torsional spring and the reaction force of the traction mechanism act on the tensioning lever is usually axially spaced apart from a central radial bearing plane of the pivot bearing or the plain bearing sleeve, there is inevitably obtained a resulting tilting moment about a tilt axis lying perpendicularly to the axis of rotation of the pivot bearing in the central bearing plane. This tilting moment disadvantageously causes non-uniform, one-sided loading, i.e. loading acting axially at the end side in diagonal opposition, of the pivot bearing with high local compressive and edge loading of the plain bearing sleeve, leading to non-uniform wear of the plain bearing sleeve and accordingly to undesirable misalignment of the tensioning lever and also of the tensioning roller fastened thereto with respect to be traction mechanism.

In order to avoid these known drawbacks, various solutions have been proposed to avoid a tilting moment of this type.

Thus, DE 42 20 879 A1 describes a tensioning device with an externally mounted tensioning lever which can be loaded via a torsional spring, which is configured as a helical spring which can be loaded in the closing direction and has end-side spring legs, relative to the base housing with a torsional moment about the axis of rotation of the pivot bearing. On the lever-side outer coil, the helical spring is connected to a sliding block which, in an angular position, which is parallel to a resulting reaction force of a traction mechanism onto the tensioning roller, with respect to the axis of rotation of the pivot bearing, is radially movably guided in a radial guide of an inner cylinder web of the tensioning lever and is pressed by a radial spring force with an inner friction surface against the cylindrical outer wall of an inner cylinder web which is connected to the base housing and arranged coaxially within the inner cylinder web of the tensioning lever.

The radial spring force and thus the frictional moment, which acts between the tensioning lever and the base housing via the friction surface of the sliding block and by which a pivoting movement of the tensioning lever is dampened, behave substantially proportionally to the torsional moment of the helical spring. Furthermore, the radial spring force compensates, via its axial spacing from a central radial bearing plane of the pivot bearing, for the tilting moment of the resulting reaction force of the traction mechanism onto the tensioning roller about a notional tilt axis lying in the central bearing plane of the pivot bearing.

Owing to the relatively small radius of the outer cylinder wall, which is in frictional contact with the sliding block, of the base housing, the frictional moment generated by the radial spring force is comparatively small, or the radial spring force must be relatively large to generate a sufficiently large frictional moment. Furthermore, it is difficult to adjust the radial spring force for exact compensation for the tilting moment of the resulting reaction force of the traction mechanism about the tilt axis. In addition, the known tensioning device has in the region of the base housing, owing to the two required cylinder webs, large radial dimensions which complicate the arrangement of this tensioning device in a traction mechanism drive.

Another tensioning device with an externally mounted tensioning lever is known from EP 0 780 597 B1 in which the tensioning lever can be loaded via a torsional spring, which is configured as a helical spring which can be loaded in the closing direction and has end-side spring legs, relative to the base housing with a torsional moment about the axis of rotation of the pivot bearing. At the housing-side spring end, the helical spring is connected with the inwardly angled spring leg via a ramp surface to a sliding block which is held in an angular position, parallel to a resulting reaction force of a traction mechanism onto the tensioning roller, with respect to the axis of rotation of the pivot bearing and is pressed by a radial component of the acting spring force with an outer friction surface against the cylindrical inner wall of an outer cylinder web connected to the tensioning lever.

The radial component of the spring force and thus the frictional moment, which acts between the tensioning lever and the base housing via the friction surface of the sliding block and by which a pivoting movement of the tensioning lever is dampened, behave substantially proportionally to the torsional moment of the helical spring.

Furthermore, the radial component of the spring force compensates, via its axial spacing from a central radial bearing plane of the pivot bearing, for the tilting moment of the resulting reaction force of the traction mechanism onto the tensioning roller about a notional tilt axis lying in the central bearing plane of the pivot bearing.

Owing to the disadvantageous lever ratios between the spring leg and the sliding block, the frictional moment generated by the radial component of the spring force is comparatively small, or the spring force must be relatively large to generate a sufficiently large frictional moment. Also, it is difficult to adjust the radial component of the spring force for precise compensation for the tilting moment of the resulting reaction force of the traction mechanism about the tilt axis. In addition, the production and assembly costs are relatively high owing to the complex construction of the sliding block arrangement. Furthermore, a spring of this type requires a disadvantageously larger overall space.

A tensioning, device with a sliding block arrangement similar to the aforementioned tensioning device is described in DE 601 05 759 T2. In contrast to the embodiment according to EP 0 780 597 B1, in the embodiment according to DE 601 05 759 T2 the tensioning lever is inwardly mounted and the sliding block arranged at the lever side, the sliding block being formed from a damping plate provided with an outer friction surface or with a friction lining. The helical spring is connected at the lever-side spring end with an inwardly angled spring leg via two contact points to the damping plate, the friction surface of which is arranged in an angular position, parallel to a resulting reaction force of a traction mechanism onto the tensioning roller, with respect to the axis of rotation of the pivot bearing, and is pressed by a radial component of the acting spring force against the cylindrical inner wall of an outer cylinder web connected to the base housing.

OBJECT OF THE INVENTION

Against this background, the invention is based on the object of specifying a tensioning device of the type mentioned at the outset that has, in a simple and overall space-optimized construction, improved adjustability, greater friction damping acting proportionally to the tensioning element, and plain bearings which are subjected to uniform loads.

SUMMARY OF THE INVENTION

The invention is based on the realization that the generation of a relatively large frictional moment to dampen the friction of a pivoting movement of the tensioning lever and a more precise adjustment of a tilting moment, which compensates for a tilting moment of the resulting reaction force of the traction mechanism with regard to the pivot bearing, can be achieved more effectively than was previously known by direct utilization, i.e. utilization without deflection and translation, of an end-side spring force of the torsional spring, which is configured as a helical spring, in conjunction with a simple and compact construction.

The object is achieved by a tensioning device of a traction mechanism drive, having a tensioning lever which is mounted on a base housing so as to be able to rotate via a pivot bearing and, radially spaced apart from the axis of rotation of the pivot bearing, is provided with a rotatable tensioning roller, which tensioning lever can, by means of a torsional spring which is configured as a helical spring, is arranged coaxially with the pivot bearing and is connected at both spring ends at the housing side to the base housing and at the lever side to the tensioning lever, be acted on with a torsional moment $M_T$ about the axis of rotation of the pivot bearing. In this case, the pivot bearing comprises a bearing journal, a bearing hub and at least one plain bearing sleeve arranged between the bearing journal and the bearing hub, a central radial force application plane of the tensioning roller being for the most part axially spaced apart from a central radial bearing plane of the pivot bearing.

In this tensioning device, provision is also made for the torsional spring to be configured as a legless helical spring which can be loaded in the opening direction and has blunt spring ends, the lever-side spring end of said helical spring resting against an axially/radially oriented stop surface of an entrainment member connected to the tensioning lever, the entrainment member being arranged at the circumferential side with respect to the axis of rotation of the pivot bearing in such a way that the stop surface is oriented normally, i.e. perpendicularly to a resulting reaction force $F_{Z\_R}$ of a traction mechanism onto the tensioning roller, a reaction force $F_{F\_R}$ of the tensioning lever onto the helical spring being supported relative to the base housing, and the center of the lever-side spring end being axially spaced apart from the central bearing plane of the pivot bearing in such a way that the tilting moments $M_K$ of a tangential spring force $F_{F\_T}$, which acts on the tensioning lever via the stop surface, of the helical spring and of the resulting reaction force $F_{Z\_R}$, which acts on the tensioning lever via the tensioning roller, of the traction mechanism cancel one another out about a notional tilt axis which perpendicularly intersects the axis of rotation of the pivot bearing in the central bearing plane perpendicularly to the spring force $F_{F\_T}$ and the reaction force $F_{Z\_R}$.

As a result of the use of the legless helical spring, the torsional moment of the torsional spring is introduced into the tensioning lever and the base housing via the blunt spring ends as a tangential spring force. This provides on the one hand a relatively simple and compact construction of the tensioning device. As the introduction of the spring forces via the blunt spring ends is precisely defined geometrically, a frictional moment, which can be generated by the spring force, about the axis of rotation of the pivot bearing and a compensatory tilting moment, which can be generated by the spring force, about the tilt axis of the pivot bearing can on the other hand be adjusted very precisely without great expense by varying the diameter, the height and the spring rigidity of the helical spring.

On the one hand, the lever-side spring force, which is introduced into the tensioning lever via the entrainment member, generates the tensioning moment, which acts on the associated traction mechanism via the tensioning roller, about the axis of rotation of the pivot bearing, the resulting reaction force of the traction mechanism balancing said tensioning moment. On the other hand, a tilting moment, which balances the tilting moment of the resulting reaction force of the traction mechanism, is generated via the lever-side spring force by way of its axial spacing from the tilt axis of the pivot bearing.

For this purpose, the entrainment member is arranged, in the case of an axially opposing arrangement, with respect to the central bearing plane of the pivot bearing, of the central force application plane of the tensioning roller and of the center of the lever-side spring end of the helical spring, in a sector of the tensioning lever that is radially remote from the tensioning roller and arranged, in the case of an axially same-side arrangement, with respect to the central bearing plane of the pivot bearing, of the central force application plane of the tensioning roller and of the center of the lever-side spring end of the helical spring, in a sector of the tensioning lever that radially faces the tensioning roller.

The friction damping of the tensioning device is advantageously achieved in that the reaction force of the tensioning lever onto the helical spring is supported at the lever side via a sliding block which is arranged set back by approximately 90°, from the stop surface of the entrainment member, about the axis of rotation of the pivot bearing with respect to the outer lever-side coil of the helical spring, rests radially inwardly against the outer lever-side coil of the helical spring, is radially movably guided in a radial guide of the tensioning lever and rests radially outwardly with a friction surface against a cylindrical inner wall of the base housing.

As a result, all of the spring force is used as a radial contact force of the sliding block to generate a frictional moment for damping the friction of a pivoting movement of the tensioning lever without influencing the equilibrium of moments of the forces acting on the tensioning lever with respect to the axis of rotation and the tilt axis of the pivot bearing.

A preferably slotted bearing ring, which is secured in a form-fitting manner against rotation relative to the tensioning lever and is made of a durable and low-friction plastics material, is expediently arranged between the outer lever-side coil of the helical spring and the tensioning lever. As a result of the use of the bearing ring, radially substantially free movability of the helical spring is achieved as a result of the fact that the outer coil is mounted so as to be able to move in a sliding manner, so that the forces and moments generated by the lever-side spring force are substantially without frictional influences and thus correspond substantially to the theoretical values. In addition, the use of bearing rings of differing thicknesses allows simple adjustment of the compensatory tilting moment, generated by the lever-side spring force, about the tilt axis of the pivot bearing and additionally stabilizes the spring or the lever.

In order to further increase the radial movability, the bearing ring can also have axial elevations, arranged at the spring side distributed over the circumference of said bearing ring, by which the outer lever-side coil of the helical spring is axially supported in a punctiform manner.

If the bearing ring is sufficiently flexible and if an appropriate material is used, the sliding block can even be integrated into the bearing ring, i.e. the sliding block can be integrally connected to the bearing ring, whereas the sliding block otherwise forms a separate component.

The entrainment member can be integrally connected to the tensioning lever. However, this requires different tensioning levers for different applications with various angular positions of the entrainment member and/or with a torsional moment rotating toward the right or left. It is therefore particularly advantageous if the entrainment member is integrated into the bearing, i.e. integrally connected to the bearing ring, as then the same tensioning lever can in each case be used with different bearing rings for different applications.

The present construction of the tensioning device allows the helical spring also to be conical in its configuration in a departure from the cylindrical design which is preferably used. Thus, the helical spring can for example taper at the housing side in order to save overall space under restricted installation conditions as a result of a reduction of the diameter of the base housing there.

Should it not be possible to compensate for the tilting moment of the resulting reaction force of the traction mechanism merely via the lever-side spring force in the described manner, the compensation of moments in this regard can be achieved using an additional second sliding block arranged on the outer housing-side coil of the helical spring and acting on the tensioning lever.

For this purpose, provision is expediently made for the housing-side spring end of the helical spring to rest against a stop surface, which is oriented axially/radially with respect to the axis of rotation of the pivot bearing, of an entrainment member connected to the base housing, the entrainment member being arranged at the circumferential side in such a way that the stop surface is oriented normally, i.e. toward the central resulting reaction force of the traction mechanism onto the tensioning roller, and in that the reaction force of the base housing onto the helical spring is supported at the lever side via the second sliding block which is arranged set back by approximately 90°, from the stop surface of the entrainment member, about the axis of rotation of the pivot bearing with respect to the outer housing-side coil of the helical spring, rests radially inwardly against the outer housing-side coil of the helical spring, is radially movably guided in a radial guide of the base housing and rests radially outwardly with a friction surface against a cylindrical inner wall of the tensioning lever, the center of the friction surface of the sliding block being axially spaced apart from the central bearing plane of the pivot bearing in such a way, that the tilting moments of the resulting reaction force of the traction mechanism, which act on the tensioning lever via the tensioning roller, the spring force of the helical spring, which acts on the tensioning lever at the lever side via the stop surface there, and the radial contact force, which is introduced into the tensioning lever at the housing side via the second sliding block about the tilt axis, cancel one another out.

This double-damping tensioning system may be applied above all to long-arm, in-line tensioning units, wherein the center of the tensioning roller and the center of the bearing can also lie in one plane.

BRIEF DESCRIPTION OF THE DRAWINGS

The invention will be described hereinafter based on various embodiments and with reference to the appended drawings in which:

FIG. 2b is a schematic radial side view of the tensioning device according to FIG. 2a;

DETAILED DESCRIPTION OF THE DRAWINGS

Figure 1:
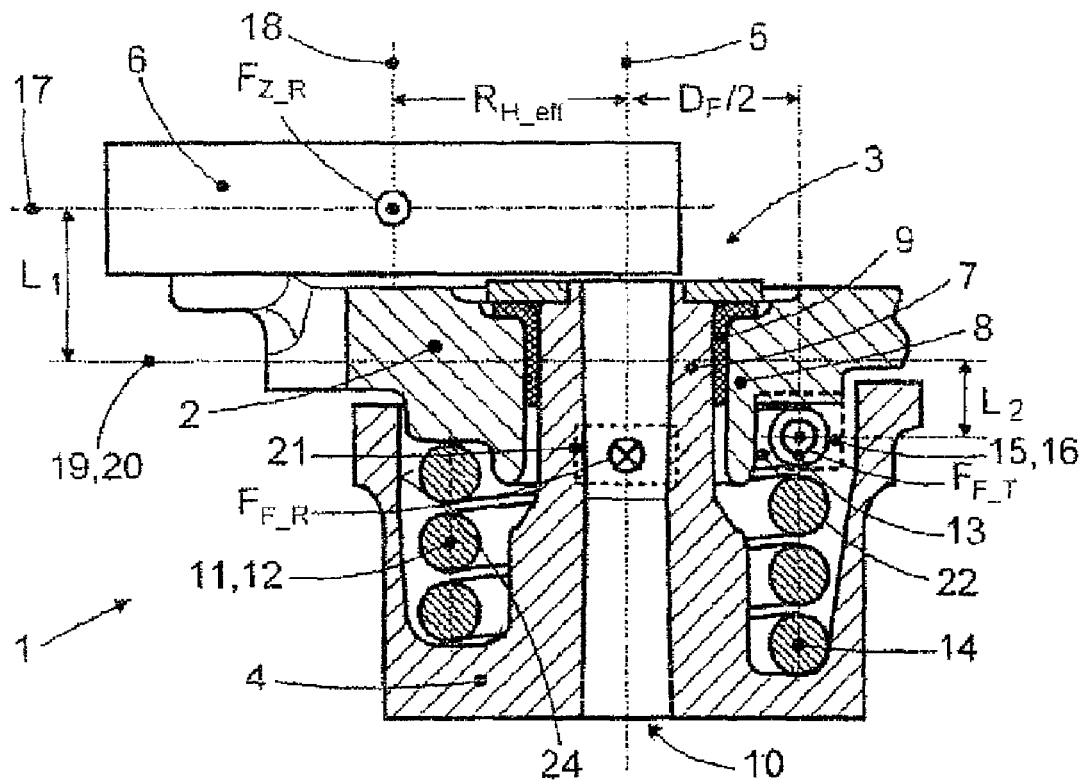
FIG. 1 is a longitudinal center section of a preferred embodiment of a tensioning device according to the invention.

FIG. 1 is a longitudinal center section of a preferred embodiment of a tensioning device 1 according to the invention of a traction mechanism drive. In what is known as an offset or Z arrangement, a tensioning lever 2 is mounted on a base housing 4 so as to be able to rotate via a pivot bearing 3 and provided, radially spaced apart from the axis of rotation 5 of the pivot bearing 3, with a rotatable tensioning roller 6. The pivot bearing 3 is formed from a bearing journal 7, a bearing hub 8 and a plain bearing sleeve 9 arranged between the bearing journal 7 and the bearing hub 8, in the present case the bearing journal 7 being rigidly connected to the base housing 4 and the bearing hub 8 being part of the tensioning lever 2. The base housing 4 is provided, for fastening to another housing, for example a crankcase or a control housing of an internal combustion piston engine, with a central bore 10 through which, for example, a fastening screw can be passed.

According to the invention, a torsional spring 11, which is arranged to act between the tensioning lever 2 and the base housing 4, is configured as a legless helical spring 12 which can be loaded in the opening direction and has blunt leg ends 13 and 14. The helical spring 12 is arranged coaxially with the pivot bearing 3 and is connected with both leg ends 13, 14 in a form-fitting manner axially at the housing side to the base housing 4 and at the lever side to the tensioning lever 2.

For tensioning a traction mechanism, which when fitted loops partly round the tensioning roller 6, of a traction mechanism drive, the tensioning lever 2 can be acted on by means of the helical screw 12 with a torsional moment $M_T$ about the axis of rotation 5 of the pivot bearing 3. The torsional moment $M_T$ is introduced into the tensioning lever 2 via the lever-side spring end 13 of the helical spring 12 in the form of a tangential spring force $F_{F\_T}$ via an axially/radially extending stop surface 15 of an entrainment member 16 secured to the lever. The acting torsional moment $M_T$ is thus obtained from the tangential spring force $F_{F\_T}$ multiplied by half the diameter $D_F/2$ of the helical spring 12 (i.e. $MT=F_{F\_T}*D_F/2$).

The resulting reaction force $F_{Z\_R}$, which acts in a central radial force application plane 17 of the tensioning roller 6, of the traction mechanism onto the tensioning roller 6 multiplied by the effective, i.e. perpendicular, spacing $R_{H\_eff}$ of the axis of rotation 18 of the tensioning roller 6 from the axis of rotation 5 of the pivot bearing 3 balances the torsional moment $M_T$ of the helical spring 12, so that for the equilibrium of moments, the following equation applies: $M_T = F_{F\_T}*D_F/2 = F_{Z\_R}*R_{H\_eff}$.

Owing to its axial spacing $L_1$ from a central radial bearing plane 19 of the pivot bearing 3, the resulting reaction force $F_{Z\_R}$ of the traction mechanism also leads to a tilting moment $M_K = F_{Z\_R}*L_1$ about a notional tilt axis 20 lying perpendicularly to the reaction force $F_{F\_T}$ of the traction mechanism and the axis of rotation 5 of the pivot bearing 3 in the central bearing plane 19; without torque compensation, this would lead to high local edge loading of the plain bearing sleeve 9 and accordingly to premature wear thereof or of the tensioning device 1.

Therefore, the entrainment member 16 is arranged at the circumferential side with respect to the axis of rotation 5 of the pivot bearing 3 in such a way that the stop surface 15 is oriented normally to the resulting reaction force $F_{Z\_R}$ of the traction mechanism onto the tensioning roller 6, and the center of the lever-side leg end 13 has an axial spacing $L_2$ from the central bearing plane 19 of the pivot bearing 3 such that the tilting moment $M_K = F_{F\_T}*L_2$ exerted by the tangential spring force $F_{F\_T}$ about the tilt axis 20 onto the tensioning lever 2 corresponds, in the opposite direction of rotation, to the tilting moment $M_K = F_{Z\_R}*L_1$ of the reaction force $F_{Z\_R}$ of the traction mechanism onto the tensioning lever 2, as a result of which moment-free loading of the plain bearing sleeve 6 is achieved. Accordingly, the following equilibrium of moments applies: $M_K = F_{Z\_R}*L_1 = F_{F\_T}*L_2$.

Figure 4:
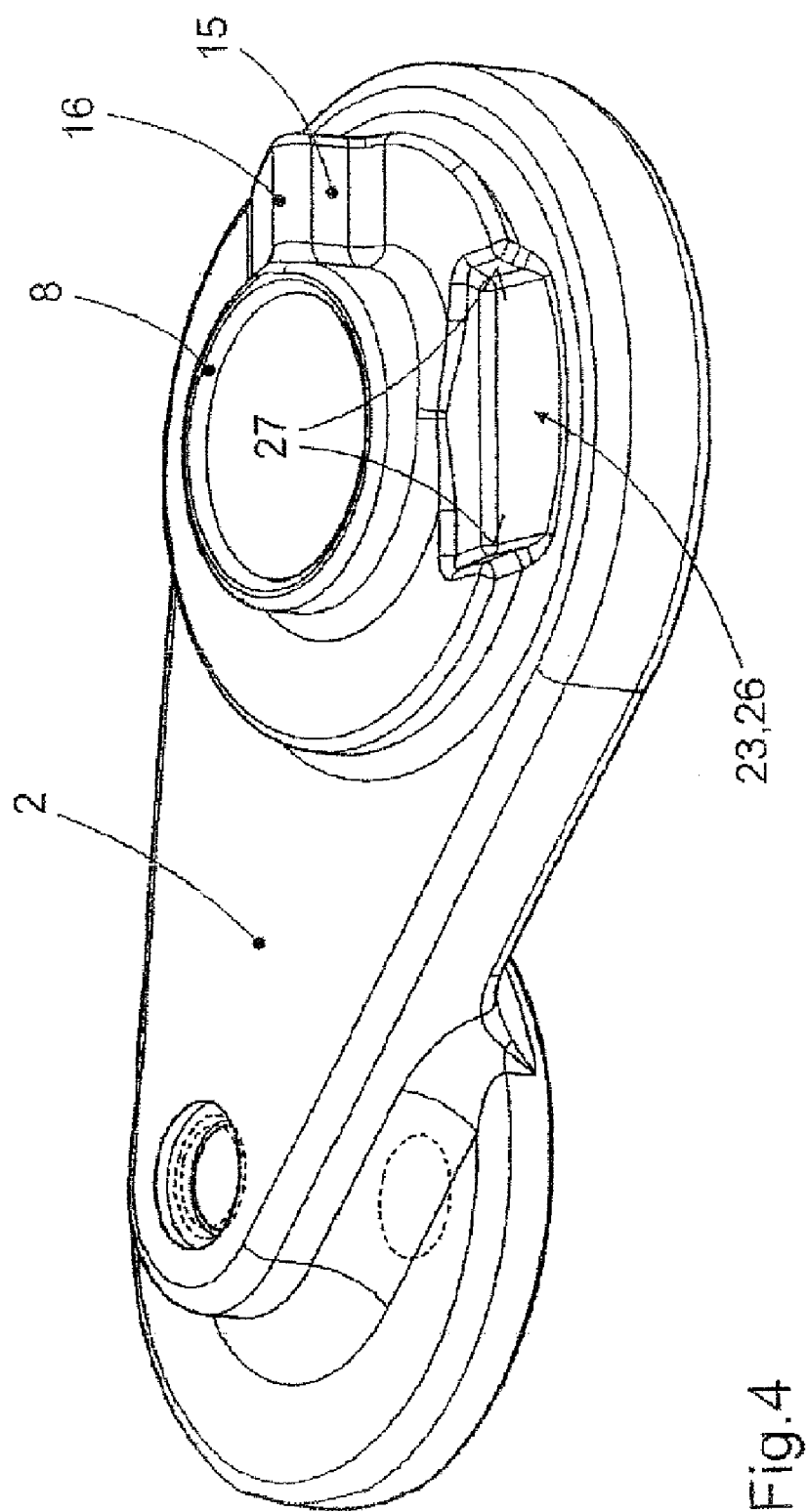
FIG. 4 is a perspective view of the tensioning lever of a tensioning device according to FIG. 1 to FIG. 3.

The lever-side supporting of the reaction force $F_{F\_R}$ of the tensioning lever 2 onto the tangential spring force $F_{F\_T}$ of the helical spring 12 occurs without influencing the equilibrium of moments of the tensioning lever 2 relative to the base housing 4 via a sliding block 21. As FIG. 2b and FIG. 2c show in particular, the sliding block 21 is arranged set back by approximately 90°, viewed from the stop surface 15 of the entrainment member 16, about the axis of rotation 5 of the pivot bearing 3 with respect to the outer lever-side coil 22 of the helical spring 12, rests in this case radially inwardly against the outer lever-side coil 22 of the helical spring 12, is radially movably guided in a radial guide 23 of the tensioning lever 2 and rests radially outwardly with a friction surface against a cylindrical inner wall 24 of the base housing 4 (FIG. 4, FIG. 5b). The supporting of the reaction force $F_{F\_R}$ of the tensioning lever 2 via the sliding block 21 causes friction damping, which is proportional to the tangential spring force $F_{F\_T}$ of the helical spring 12, of a pivoting movement of the tensioning lever 2 relative to the base housing 4.

Owing to the prevailing moment and force relations wherein $M_T = F_{F\_T}*D_F/2 = F_{Z\_R}*R_{H\_eff}$ or $F_{F\_T}/F_{Z\_R} = R_{H\_eff}/D_F/2$ and $M_K = F_{Z\_R}*L_1 = F_{F\_T}*L_2$ or $F_{F\_T}/F_{Z\_R} = L_1/L_2$, the axial spacing $L_2$, required for the compensation of moments, of the lever-side spring end 13 of the helical spring 12 from the central bearing plane 19 of the pivot bearing 3 can be determined, all other dimensions being given, in accordance with the equation $$L_2 = L_1 * D_F/(2R_{H\_eff})$$

Figure 2A:
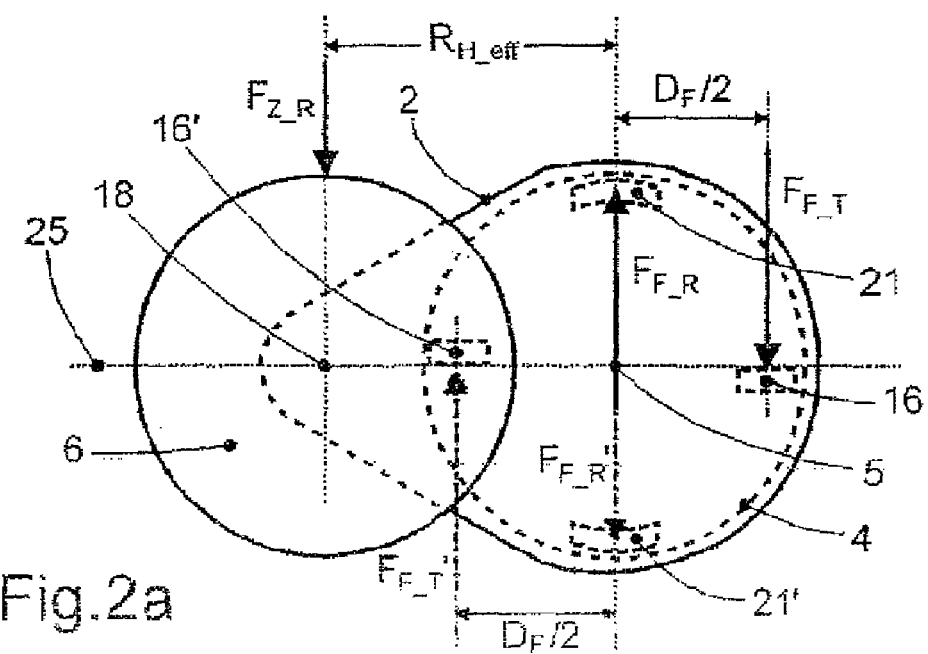
FIG. 2a is a schematic axial view of a tensioning device according to FIG. 1 to illustrate the lever ratios.
Figure 2B:
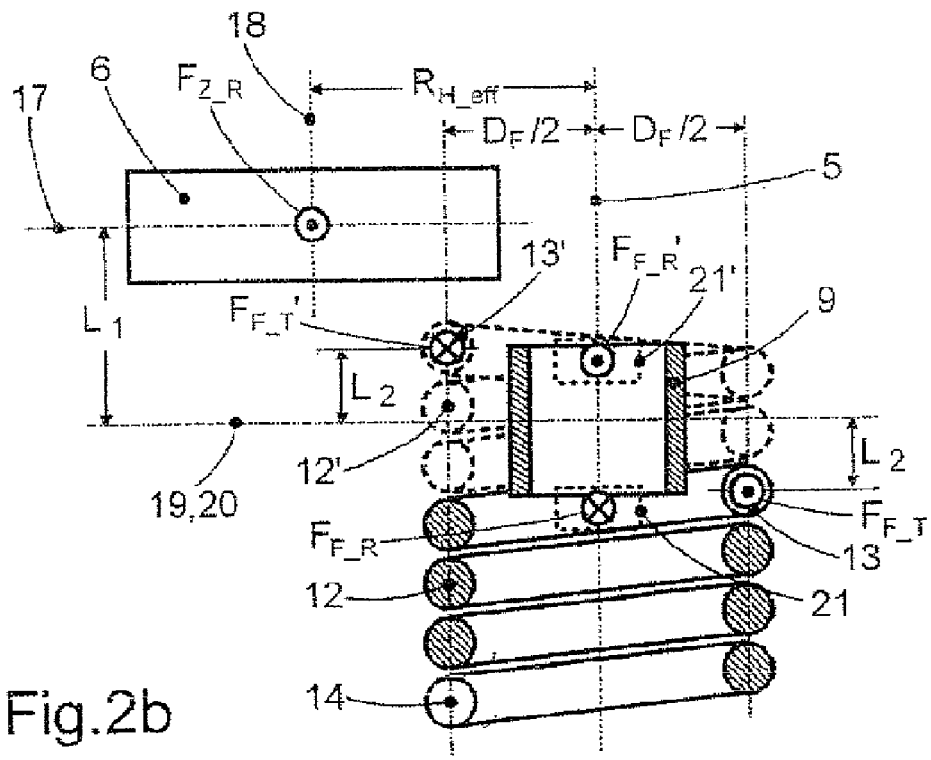
Figure 2C:
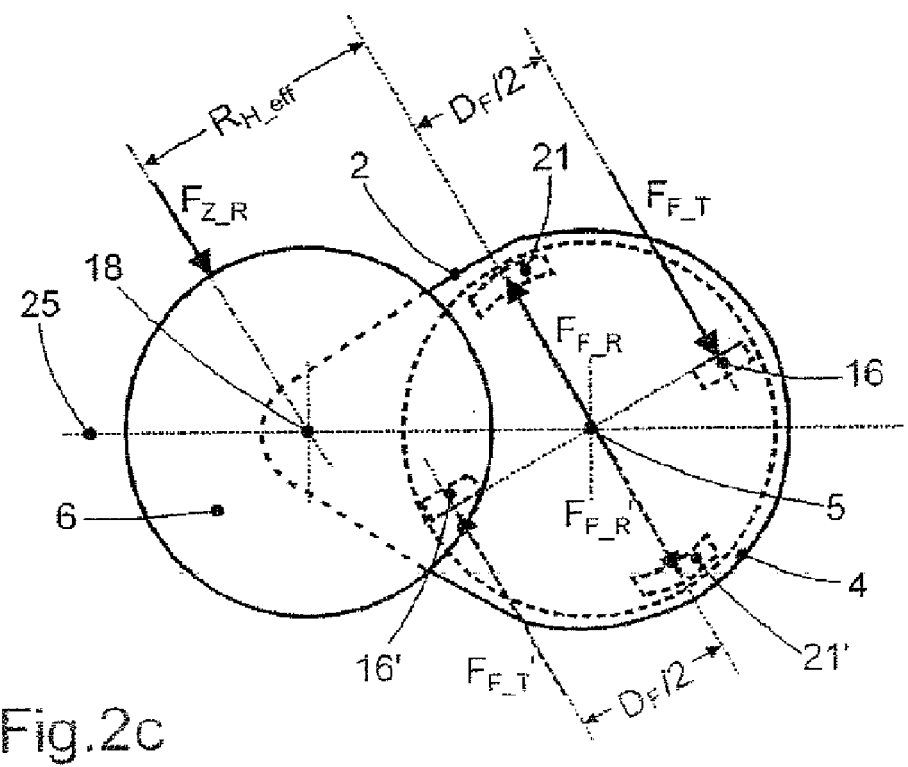
FIG. 2c is a schematic axial view of the tensioning device according to FIG. 2a with altered force directions.

To illustrate the lever ratios, the tensioning device 1 according to FIG. 1 is represented in a greatly simplified schematic form in FIG. 2a, in an axial view looking from the tensioning lever 2 onto the base housing 4, and in FIG. 2b in a radial side view corresponding to FIG. 1. In this view, the helical spring 12, the entrainment member 16 and the sliding block 21 and also the acting forces $F_{F\_T}$, $F_{Z\_R}$, $F_{F\_R}$ are represented, in accordance with the view according to FIG. 1, for an arrangement of the lever-side spring end 12 on the side axially opposing the tensioning roller 6 with respect to the central bearing plane 19 of the pivot bearing 3 or the plain bearing sleeve 9 of the tensioning roller 6. Accordingly, the entrainment member 16 is arranged, to achieve the desired torsional moment $M_T$ and the compensatory tilting moment $M_K$, offset by 90° in the anticlockwise direction with respect to the axis of rotation 5 of the pivot bearing 3, radially opposing the tensioning roller 6, as is the sliding block 21 relative to the entrainment member 16.

However, in addition, FIG. 2a and FIG. 2b also show the arrangement of the helical spring 12', the entrainment member 16' and the sliding block 21' and also the acting forces $F_{F\_T'}$, $F_{F\_R'}$ which are obtained when the lever-side spring end 13' lies on the axially same side, with respect to the central bearing plane 19 of the pivot bearing 3 or the plain bearing sleeve 9, as the tensioning roller 6. In this case, the entrainment member 16' is arranged, to achieve the desired torsional moment $M_T$ and the compensatory tilting moment $M_K$, offset by 90° in the anticlockwise direction with respect to the axis of rotation 5 of the pivot bearing 3, radially on the same side as the tensioning roller 6, as is the sliding block 21' accordingly relative to the entrainment member 16'.

Up until now, it has been assumed for the sake of simplicity that the traction mechanism ideally loops, in the working position of the tensioning lever 2, round the tensioning roller 6 in such a way that the loading of the traction mechanism onto the tensioning roller 6 and the tensioning lever 2, i.e. the resulting reaction force $F_{Z\_R}$, is oriented precisely perpendicularly to the geometric axis 25 of the tensioning lever 2, by which geometric axis the axis of rotation 5 of the pivot bearing 3 is connected to the axis of rotation 18 of the tensioning roller 6. In this case, the effective radial spacing $R_{H\_eff}$ of the reaction force $F_{Z\_R}$ from the axis of rotation 5 of the pivot bearing 3 is identical to the geometric spacing of the axis of rotation 18 of the tensioning roller 6 from the axis of rotation 5 of the pivot bearing 3.

However, such installation conditions are in practice not common, so that the reaction force $F_{Z\_R}$ is usually at least slightly inclined relative to the normal on the geometric axis 25 of the tensioning lever 2 about the axis of rotation 18 of the tensioning roller 6. This is illustrated by way of example in FIG. 2c in an axial view based on FIG. 2c in the form of a reaction force $F_{Z\_R}$ acting inclined by approximately 30° relative to the normal. Accordingly, the entrainment member 16 or 16' and the sliding block 21 or 21' must then also be arranged rotated about the axis of rotation 5 of the pivot bearing 3, so that the compensation for the tilting moment $M_K$ generated by the reaction force $F_{Z\_R}$ is provided in the intended manner by the tangential spring force $F_{F\_T}$ or $F_{F\_T'}$.

Figure 3:
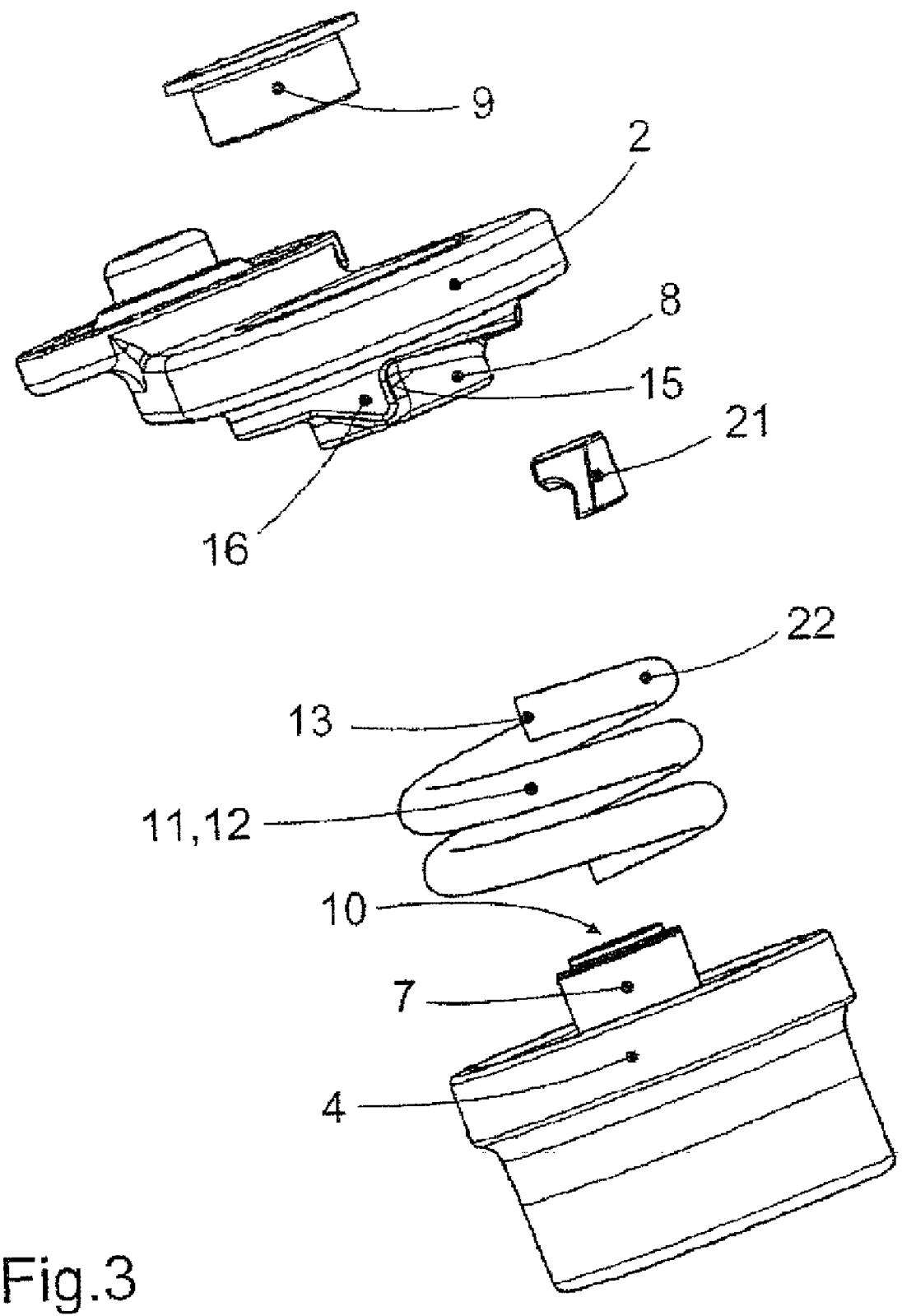
FIG. 3 is an exploded view of the most important components of a tensioning device according to FIG. 1 to FIG. 2c.

The most important components of the tensioning device 1 according to the invention are illustrated by way of example in an exploded view in FIG. 3. The tensioning lever 2, which is shown in this case without the tensioning roller 6, comprises in this embodiment in one piece, in addition to the bearing hub 8, also the entrainment member 16 with the stop surface 15 against which the lever-side spring end 13 of the helical spring 12 rests when fitted. The bearing journal 7, which is provided with the central bore 10, is rigidly connected to the cup-shaped base housing 4.

A practical embodiment of the tensioning lever 2 is illustrated in FIG. 4 in a perspective oblique view onto the side facing the base housing 4. This shows, in addition to the bearing hub 8 and the entrainment member 16 with the stop surface 15, in particular a possible configuration of the radial guide 23 which is provided for the sliding block 21 and is configured in this case as an axial recess 26 with radial guide surfaces 27 arranged at the circumferential side.

Figure 5A:
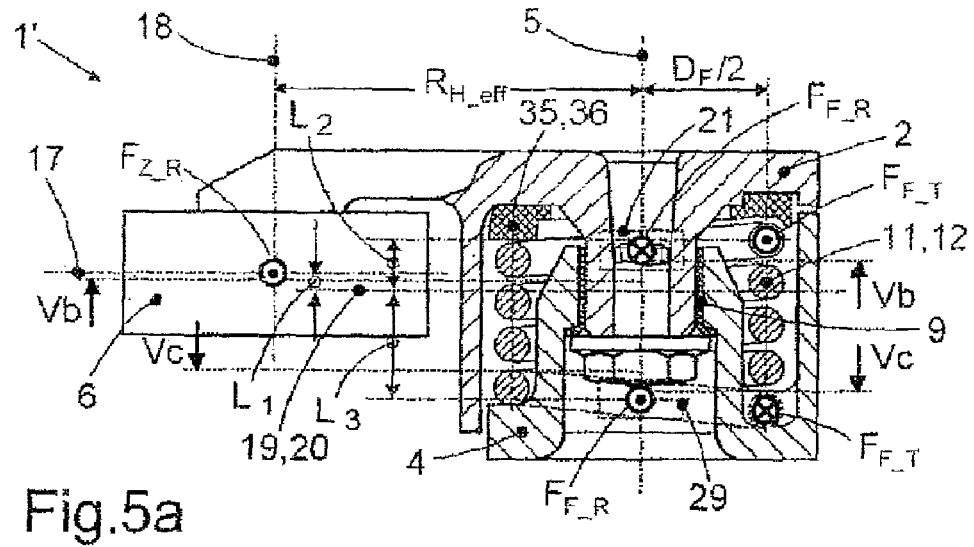
FIG. 5a is a longitudinal center section of a developed embodiment of a tensioning device according to the invention.
Figure 5B:
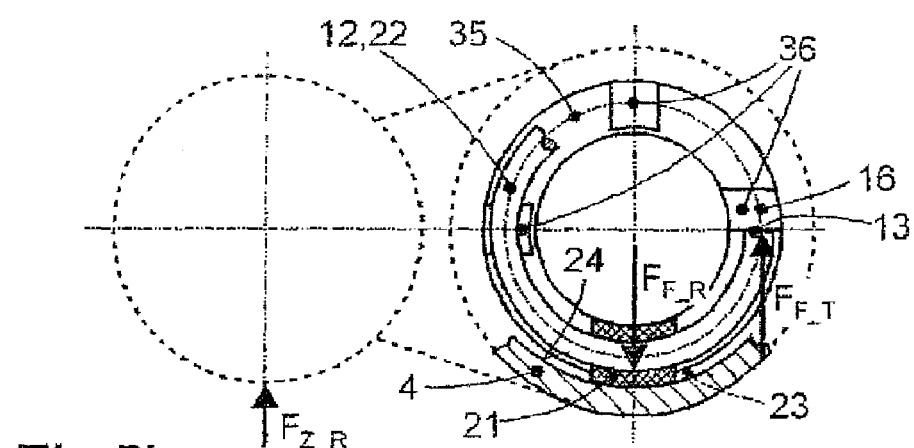
FIG. 5b is a simplified axial sectional view of the tensioning device according to FIG. 5a taken along section Vb-Vb.

A developed embodiment of the tensioning device 1' according to the invention is illustrated in FIG. 5a in a radial view of a longitudinal center section, in FIG. 5b in an axial sectional view Vb-Vb according to FIG. 5a looking from the base housing 4 onto the tensioning lever 2, and in an axial sectional view Vc-Vc according to FIG. 5a looking from the tensioning lever 2 onto the base housing 4. In an in-line arrangement or U arrangement, the tensioning roller 6 is arranged on the inside axially facing the base housing 4. The resulting reaction force $F_{Z\_R}$ of the traction mechanism onto the tensioning roller 6 and the tangential spring force $F_{F\_T}$ of the helical spring 12 act on the side, axially remote from the base housing 4, of the central bearing plane 19 of the pivot bearing 3 in the same direction of action with respect to the tilt axis 20 with the lever arm $L_1$ or $L_2$. Obtained from this is the acting tilting moment $M_K = F_{Z\_R}*L_1 + F_{F\_T}*L_2$ about the tilt axis 20.

In order to compensate for this tilting moment $M_K$, the reaction force $F_{F\_R}$ of the base housing 4 onto the tangential spring force $F_{F\_T}$ introduced into the base housing 4 at the housing side from the housing-side spring end 14 via an entrainment member 28 is supported relative to the tensioning lever 2 via a second sliding block 29. For this purpose, the second sliding block 29 is arranged set back by approximately 90°, from the stop surface 31 of the entrainment member 28, about the axis of rotation 5 of the pivot bearing 3 with respect to the outer housing-side coil 30 of the helical spring 12, rests radially inwardly against the outer housing-side coil 30 of the helical spring 12, is radially movably guided in a radial guide 32 of the base housing 4 and rests radially outwardly with a friction surface against a cylindrical inner wall 33 of a, in sections, cylindrical shell 34, which is connected to the tensioning lever 2.

The supporting of the reaction force $F_{F\_R}$ of the base housing 4 via the second sliding block 29 generates with the lever arm $L_3$ a compensatory moment $M_K = F_{F\_R}*L_3$ about the tilt axis 20, which compensatory moment balances the moment $M_K$ of the reaction force $F_{Z\_R}$ and the spring force $F_{F\_T}$ introduced into the tensioning lever 2 at the lever side and thus brings about moment-free loading of the plain bearing sleeve 9 ($M_K = F_{Z\_R}*L_1 + F_{F\_T}*L_2 = F_{F\_R}*L_3$). As the tangential spring force $F_{F\_T}$ and the radial supporting force $F_{F\_R}$ are identical in terms of amount, the following also applies: $F_{Z\_R}*L_1 = F_{F\_T}*(L_3-L_2)$ or $F_{F\_T}/F_{Z\_R} = L_1/(L_3-L_2)$.

Accordingly, the axial spacing $L_3$, required for the compensation of moments, of the housing-side spring end 14 of the helical spring 12 from the central bearing plane 19 of the pivot bearing 3 can be determined, all other dimensions being given, by the likewise valid relation $M_T = F_{F\_T}*D_F/2 = F_{Z\_R}*R_{H\_eff}$ or $F_{F\_T}/F_{Z\_R} = R_{H\_eff}/D_F/2$ in accordance with the equation $L_3 = L_1*D_F/(2 R_{H\_eff}) + L_2$.

The supporting of the reaction force $F_{F\_R}$ of the tensioning lever 2 via the lever-side first sliding block 21 and via the housing-side second sliding block 29 causes particularly marked friction damping of a pivoting movement of the tensioning lever 2 relative to the base housing 4, which damping is proportional to the tangential spring force $F_{F\_T}$ of the helical spring 12.

Figure 5C:
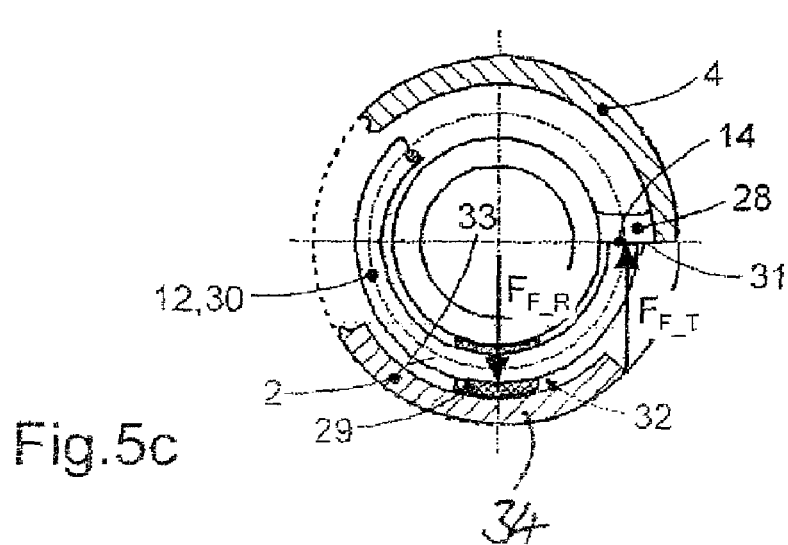
FIG. 5c is a simplified axial sectional view of the tensioning device according to FIG. 5a taken along section Vc-Vc.

In the views according to FIG. 5a to FIG. 5c, a bearing ring 35, which is made of a durable and low-friction plastics material, is secured in a form-fitting manner against rotation relative to the tensioning lever 2 and has axial elevations 36 arranged at the spring side distributed over the circumference of said bearing ring, is arranged by way of example between the outer lever-side coil 22 of the helical spring 12 and the tensioning lever 2. As a result, the outer lever-side coil 22 of the helical spring 12 is axially supported in a punctiform manner and can move radially substantially unimpeded as the helical spring 12 springs inward and outward. If the bearing ring 35 is sufficiently flexible, the lever-side sliding block 21 can also be integrated into the bearing ring 35 in one piece.

LIST OF REFERENCE NUMERALS

1 Tensioning device
1' Tensioning device
2 Tensioning lever
3 Pivot bearing
4 Base housing
5 Axis of rotation (of 2, 3)
6 Tensioning roller
7 Bearing journal
8 Bearing hub
9 Plain bearing sleeve
10 Central bore
11 Torsional spring
12 Helical spring
12' Helical spring
13 (Lever-side) spring end
13' (Lever-side) spring end
14 (Housing-side) spring end 15 Stop surface (of 16)
16 Entrainment member
16' Entrainment member
17 Central force application plane (of 6)
18 Axis of rotation (of 6)
19 Central bearing plane
20 Tilt axis
21 (First) sliding block
21' Sliding block
22 Outer lever-side coil (of 12)
23 Radial guide
24 Inner wall
25 Geometric axis (of 2)
26 Recess
27 Guide surface
28 Entrainment member
29 (Second) sliding block
30 Outer housing-side coil
31 Stop surface (of 28)
32 Radial guide
33 Inner wall
34 Shell
35 Bearing ring
36 Axial elevation
$D_F$ Diameter (of 12)
$F_{F\_R}$ (Radial) reaction force (of 2, 12)
$F_{F\_R'}$ (Radial) reaction force (of 2, 12)
$F_{F\_T}$ Tangential spring force (of 12)
$F_{F\_T'}$ Tangential spring force (of 12)
$F_{Z\_R}$ (Radial) reaction force
$L_1$ Axial spacing
$L_2$ Axial spacing
$L_3$ Axial spacing
$M_K$ Tilting moment (about 20)
$M_T$ Torsional moment (about 5)
$R_{H\_eff}$ Effective radial spacing

The invention claimed is:

1. A tensioning device of a traction mechanism drive, comprising: a tensioning lever which is mounted on a base housing so as to be able to rotate via a pivot bearing and, radially spaced apart from the axis of rotation of the pivot bearing, is provided with a rotatable tensioning roller, which tensioning lever can, by means of a torsional spring which is configured as a helical spring, is arranged coaxially with the pivot bearing and is connected at both spring ends at the housing side to the base housing and at the lever side to the tensioning lever, be acted on with a torsional moment about the axis of rotation of the pivot bearing, the pivot bearing comprising a bearing journal, a bearing hub and at least one plain bearing sleeve arranged between the bearing journal and the bearing hub, and a central radial force application plane of the tensioning roller being axially spaced apart from a central radial bearing plane of the pivot bearing, characterized in that the torsional spring is configured as a legless helical spring which can be loaded in the opening direction and has blunt spring ends, the lever-side spring end of said helical spring resting against an axially/radially oriented stop surface of an entrainment member connected to the tensioning lever, the entrainment member being arranged at the circumferential side with respect to the axis of rotation of the pivot bearing in such a way that the stop surface is oriented normally to a resulting reaction force of a traction mechanism onto the tensioning roller, a reaction force of the tensioning lever onto the helical spring being supported relative to the base housing, and the center of the lever-side spring end being axially spaced apart from the central bearing plane of the pivot bearing in such a way that the tilting moments of a tangential spring force, which acts on the tensioning lever via the stop surface, of the helical spring and of the resulting reaction force, which acts on the tensioning lever via the tensioning roller, of the traction mechanism cancel one another out about a notional tilt axis which perpendicularly intersects the axis of rotation of the pivot bearing in the central bearing plane perpendicularly to the spring force and the reaction force.

2. The tensioning device as claimed in claim 1, wherein the entrainment member is arranged, in the case of an axially opposing arrangement, with respect to the central bearing plane of the pivot bearing, of the central force application plane of the tensioning roller and of the center of the lever-side spring end of the helical spring, in a sector of the tensioning lever that is radially remote from the tensioning roller.

3. The tensioning device as claimed in claim 1, wherein the entrainment member is arranged, in the case of an axially same-side arrangement of the central force application plane of the tensioning roller, with respect to the central bearing plane of the pivot bearing, and of the center of the lever-side spring end of the helical spring, in a sector of the tensioning lever that radially faces the tensioning roller.

4. The tensioning device as claimed in claim 1, wherein the reaction force of the tensioning lever onto the helical spring is supported at the lever side via a sliding block which is arranged set back by approximately 90°, from the stop surface of the entrainment member, about the axis of rotation of the pivot bearing with respect to the outer lever-side coil of the helical spring, rests radially inwardly against the outer lever-side coil of the helical spring, is radially movably guided in a radial guide of the tensioning lever and rests radially outwardly with a friction surface against a cylindrical inner wall of the base housing.

5. The tensioning device as claimed in claim 1, wherein a bearing ring, which is secured in a form-fitting manner against rotation relative to the tensioning lever and is made of a durable and low-friction plastics material, is arranged between the outer lever-side coil of the helical spring and the tensioning lever.

6. The tensioning device as claimed in claim 5, wherein the bearing ring has axial elevations, arranged at the spring side distributed over the circumference of said bearing ring, for axially supporting the outer lever-side coil of the helical spring in a punctiform manner.

7. The tensioning device as claimed in claim 5, wherein the sliding block is integrally connected to the bearing ring.

8. The tensioning device as claimed in claim 5, wherein the entrainment member is integrally connected to the bearing ring.

9. The tensioning device as claimed in claim 1, wherein that the entrainment member is integrally connected to the tensioning lever.

10. The tensioning device as claimed in claim 1, wherein the helical spring is conical in its configuration.

11. The tensioning device as claimed in claim 1, wherein the housing-side spring end of the helical spring rests against a stop surface, of an entrainment member connected to the base housing, which stop surface is oriented axially/radially with respect to the axis of rotation of the pivot bearing, the entrainment member being arranged at the circumferential side in such a way that the stop surface is oriented normally to the central resulting reaction force of the traction mechanism onto the tensioning roller, and in that the reaction force of the base housing onto the helical spring is supported at the lever side via a second sliding block which is arranged set back by approximately 90° from the stop surface of the entrainment member, about the axis of rotation of the pivot bearing with respect to the outer housing-side coil of the helical spring, rests radially inwardly against the outer housing-side coil of the helical spring, is radially movably guided in a radial guide of the base housing and rests radially outwardly with a friction surface against a cylindrical inner wall of the tensioning lever, the center of the friction surface of the sliding block being axially spaced apart from the central bearing plane of the pivot bearing in such a way, that the tilting moments of the resulting reaction force of the traction mechanism, which act on the tensioning lever via the tensioning roller, the spring force of the helical spring, which acts on the tensioning lever at the lever side via the stop surface there, and the radial contact force, which is introduced into the tensioning lever at the housing side via the second sliding block about the tilt axis, cancel one another out.

\* \* \* \* \*